United States Patent [19]

Hellgren

[11] 4,105,388

[45] Aug. 8, 1978

[54] HYDRAULIC PRESS

[75] Inventor: Keijo Hellgren, Vesteras, Sweden

[73] Assignee: Asea Aktiebolag, Vesteras, Sweden

[21] Appl. No.: 752,282

[22] Filed: Dec. 20, 1976

[30] Foreign Application Priority Data

Dec. 23, 1975 [SE] Sweden ............................... 7514607

[51] Int. Cl.[2] ............................................ B29C 17/06

[52] U.S. Cl. ....................................... 425/389; 72/63; 425/DIG. 19

[58] Field of Search ....... 425/389, 394, 405, DIG. 19, 425/DIG. 44, DIG. 112; 72/63; 264/314

[56] References Cited

U.S. PATENT DOCUMENTS

| | | | |
|---|---|---|---|
| 2,771,850 | 11/1956 | Wheelon | 72/63 |
| 2,923,130 | 2/1960 | Wheelon | 425/DIG. 19 |
| 3,006,306 | 10/1961 | Pfeiffer et al. | 425/DIG. 19 |
| 3,545,241 | 12/1970 | Grankowski et al. | 425/389 X |
| 3,614,811 | 10/1971 | Johnson | 425/389 |
| 3,888,618 | 6/1975 | Jones | 425/389 |

*Primary Examiner*—Robert L. Spicer, Jr.

*Attorney, Agent, or Firm*—Watson, Cole, Grindle & Watson

[57] ABSTRACT

A press for molding large sheets around a forming surface which includes an elastic press pad, a first frame member on the side of the press pad away from the working surface thereof, the first frame member having a top wall and side walls forming a pressure cell area therebetween, an elastic diaphragm in the pressure cell area in contact with the press pad, a second frame member formed in a generally L-shaped configuration to encompass and hold an annular bead of the elastic diaphragm, a trough-shaped supporting member positioned adjacent the end walls of the first frame member and the press pad such that a gap is formed between the end walls and the supporting member, a movable seal strip positioned in the gap to prevent the press pad from being pressed out of the pressure cell area when the elastic diaphragm is expanded, and a supporting strip attached to the end walls of the first frame member at a point within the pressure cell area to secure the press pad within the pressure cell area.

6 Claims, 5 Drawing Figures

HYDRAULIC PRESS

BACKGROUND OF THE INVENTION

1. Field of the Invention

The present invention relates to hydraulic presses that have very large working surfaces for pressing and forming sheets which are resting on a forming tool. More specifically, the present invention relates to the mechanism used for applying the compressive force to an elastic pad which then acts to press the sheets against the forming tool.

2. Description of the Prior Art

In hitherto known presses, very large working surfaces have been utilized to form or mold sheets of various materials on a suitable forming tool. This forming has been achieved by pressing the sheets against the forming tools by means of a forming pad of elastic material. The compressive force is achieved by use of a pressure medium which is pumped into a pressure cell with a bag-like diaphragm located above the press pad. The diaphragm is formed with an annular bead around an opening and is secured between two attachment members, at least one of them being annular in shape. These attachment members form an annular slot fitting the shape of the diaphragm bead. The pressure medium space is then defined by the inner surface of the diaphragm and the attachment members. Tools with workpieces are placed in a recess in a trough-like supporting member which can be displaced between a position outside the press and a pressing position inside the press. At the end wall, defining the pressure cell space, there is a vertically movable metallic sealing strip which, during pressing, is pressed downwards towards an end piece wall in the trough-like supporting member for tools and workpieces, thus bridging an unavoidable gap between these end walls and preventing the press pad from being pressed out through the gap.

In presses of hitherto known designs, the diaphragm at the end pieces of the press has been subjected to movements and forces when filling the pressure cell, involving leakage and tendencies of withdrawal of the diaphragm bead from the slot for this bead formed by the attachment members.

The present invention substantially eliminates these harmful movements and forces and improves the mode of operation of the press, the sealing ability of the diaphragm attachment and the life of the diaphragm.

SUMMARY OF THE INVENTION

In accordance with the present invention, the end walls, which define the cavity where the pressure cell and the press pad are arranged, are provided with horizontal supporting strips firmly joined to the end walls, these supporting strips being arranged above the mentioned horizontal sealing strips. The supporting strips are thus not movable in a vertical direction. The portions of the press pad located above the supporting strip and horizontally outside the attachment portion of the diaphragm form a bead which is secured in its position by the supporting strip. The supporting strip prevents this part of the press pad from being drawn down towards the forming space where the workpieces are placed when the pressure cell is filled with pressure medium and the pressure cell and forming pad are extended. The invention prevents the creation of a vacuum outside the end portion of the diaphragm, whereby the bead-like portion of the press pad during this critical stage of a working cycle will form a satisfactory support for the diaphragm.

DETAILED DESCRIPTION OF THE PREFERRED EMBODIMENT

Figure 1:
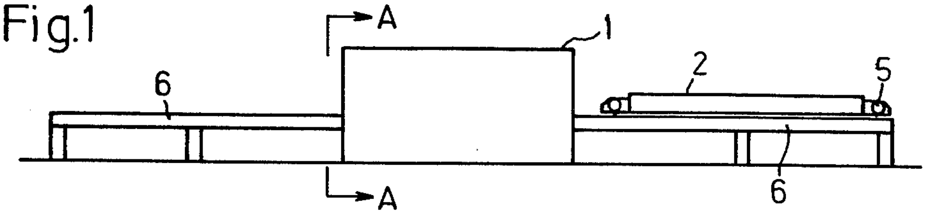
FIG. 1 shows a side view of a typical press facility.
Figure 4:
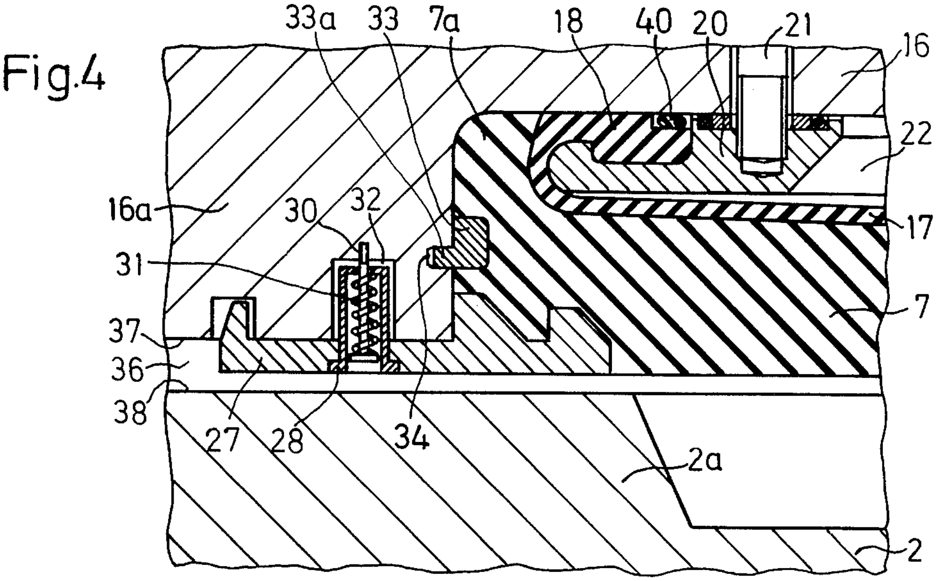
FIGS. 4 and 5 show parts of the FIG. 3 section on an enlarged scale.
Figure 3:
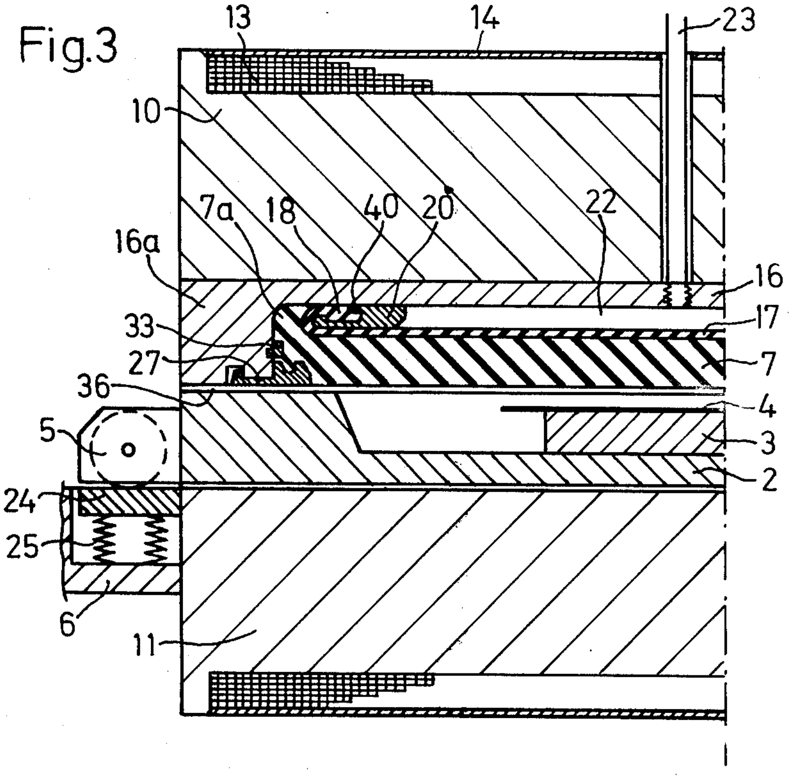
FIG. 3 shows a vertical longitudinal section along B—B of FIG. 2.

Referring to the Figures, 1 shows a press stand and 2 a trough-shaped supporting member in which forms 3 and sheets 4 (see FIG. 3) to be formed are placed. The supporting member is provided wih transport rollers 5 running on tracks 6. The supporting member or trough 2 is displaceable between the position shown in FIG. 1, in which pressed sheets are removed and new sheets 4 are placed on forms 3, and a position inserted into the press stand in which a press pad 7 forms the sheets. The press stand shown is of the kind which is composed of an upper yoke 10, a lower yoke 11, two spacers 12 and a strip sheath 13 holding these objects together. This strip sheath is surrounded by a protective plate 14. The stand rests on a support 15 having bearing surfaces shaped to suit the shape of the press stand. The yokes 10 and 11 and the spaces form a rectangular window opening and a parallelepipedic space. At the upper part of this space a disc first frame member 16 with end walls 16*a* is suspended by means of attachment devices (not shown). In the depression between the end walls 16*a*, a bag-like diaphragm 17 with an annular bead 18 around its opening is inserted with the help of a second frame member 20 and bolts 21. The frame 20, which has an L-shaped configuration, and the disc 16 form a slot fitting the bead 18. The diaphragm 17, the disc 16 and the frame 20 define a space 22 and form a pressure cell. This communicates with a pressure medium source (not shown) through conduit 23 and valve devices (not shown). The diaphragm 17 also fills up spaces between the attachment portion of the diaphragm and vertical walls in the disc 16, i.e., spaces horizontally outside the diaphragm.

When the trough-shaped supporting member 2 is in the press stand, the transport rollers 5 rest on discs 24 which are supported by springs 25 with such a strength that they are capable of carrying the supporting member 2 with forms 3 and workpieces 4. During pressing, the supporting member 2 will rest on the lower yoke 11. When the supporting member 2 is in the pressing position in the press, its end walls 2*a* are located below the end walls 16*a* of the disc 16.

A metallic sealing strip 27 is vertically movably attached in the end wall 16*a* with the help of hat-shaped elements 28, bolts 30 and springs 31. The elements 28 project into bored holes 32 in the end wall 16*a*. The object of the sealing strip 27 is to bridge the gap 36 between surfaces 37 and 38 during the pressing operation, thus preventing the press pad from being pressed out through the gap 36. An L-shaped (in cross section) supporting strip 33 is applied in the end wall 16*a*, one flange 33*a* of the strip projecting into a horizontal slot 34. In the portion above the supporting strip 33 and outside the bead 18, the diaphragm 7 forms a bead 7*a*.

Figure 5:
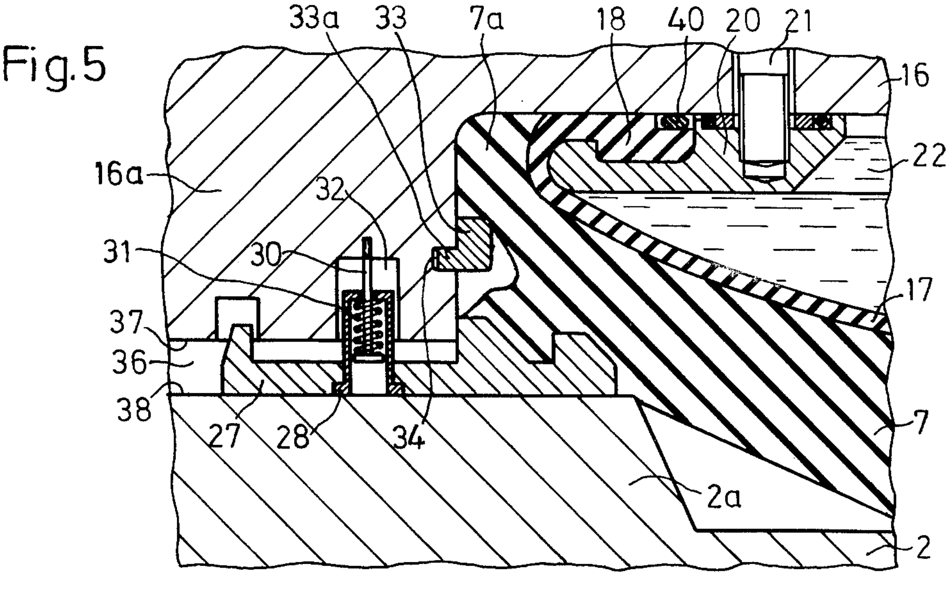
Figure 2:
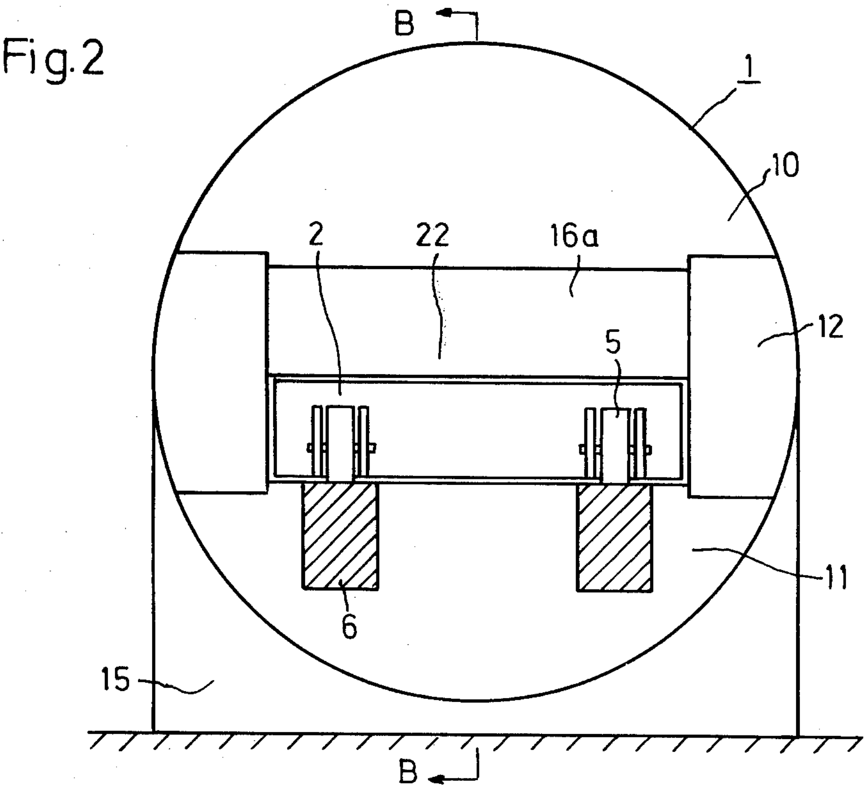
FIG. 2 shows an end view section through the press along A—A of FIG. 1 when the press is in accordance with the present invention.

As is clear from FIG. 5, the supporting strip 33 prevents the material of the press pad outside the attachment bead 18 of the diaphragm from being drawn down from the corner space when the pressure cell space 22 is filled with pressure medium and the sealing strip is pressed down towards the surface 38. The end portions of the diaphragm 17 are then supported at this stage by the press pad bead *7a* so that the stresses are reduced and the risk of withdrawal of the bead 18 from the attachment slot between the disc 16 and the frame 20 is reduced. Leakage between the seal 40 and the bead 18 and the disc 16, respectively, is eliminated to a considerable extent.

While there has been shown and described what is considered to be a preferred embodiment of the present invention, it will be obvious to those skilled in the art that various charges and modifications may be made therein without departing from the invention as described in the appended claims.

I claim:

1. In a hydraulic press which includes wall means forming a press area therebetween, a first frame member having top and end walls to form thereby a pressure cell area positioned within said space, an elastic press pad supported against the top of said first frame member, a second frame member mounted within said pressure cell area, a bag-like elastic diaphragm positioned in said pressure cell area between said second frame member and said press pad and having an annular bead which fills an annular slot formed between said second frame member and the top wall of said first frame member, a movable trough-shaped supporting member positioned adjacent the end walls of said first frame member and said press pad such that with expansion of said press pad as a result of expansion of said elastic diaphragm said press pad moves into the trough space of said trough-shaped supporting member, there being a gap between said trough-shaped supporting member and the end walls of said first frame member, and a seal strip positioned in the gap between the end walls of said first frame member and said trough-shaped supporting member, said sealing strip being vertically movable and functioning to prevent the press pad from being pressed out of the pressure cell area through the gap when the elastic diaphragm is expanded, the improvement wherein a supporting strip is attached to the end walls of the first frame member so as to be locked against movement in a vertical direction at a point within the pressure cell area and so as to secure the press pad within the pressure cell area.

2. The press of claim 1, wherein the end walls of the first frame member which in part form the pressure cell area include means forming slots therein, and wherein the supporting strip includes a flange which projects into the slots.

3. The press of claim 1, wherein said supporting strip is positioned such that the press pad has a bead thereof formed between the supporting strip and the second frame member.

4. The press of claim 1, wherein means are positioned between the end walls of the first frame member and the sealing strip to move the sealing strip into contact with the trough-shaped supporting member.

5. The press of claim 4, wherein said means include bolts attached to the end walls, hat-shaped elements attached to the sealing strip, the heads of the bolts extending into the hat-shaped elements, and springs wrapped around said bolts.

6. The press of claim 2, wherein said supporting strip is L-shaped in cross-section, one portion of which comprises said flange which projects into said slots.

* * * * *